Sept. 17, 1963   M. A. DE CORTE ETAL   3,103,831
AUTOMATIC POWER TRANSMISSION CONTROL
Filed Oct. 7, 1957   3 Sheets-Sheet 1

FIG.1

MICHAEL A. DECORTE
ROBERT P. ZUNDEL
ROBERT O. DAMERON
INVENTORS

BY Edwin C. McRae
John R. Faulkner
Donald J. Harrington

ATTORNEYS

United States Patent Office

3,103,831
Patented Sept. 17, 1963

3,103,831
AUTOMATIC POWER TRANSMISSION CONTROL
Michael A. De Corte, Farmington, and Robert O. Dameron and Robert P. Zundel, Detroit, Mich., assignors to Ford Motor Company, Dearborn, Mich., a corporation of Delaware
Filed Oct. 7, 1957, Ser. No. 688,526
19 Claims. (Cl. 74—677)

Our invention relates generally to a multiple speed, automatic power transmission mechanism and more particularly to an improved control valve circuit for use therewith.

Our invention is particularly adapted to be used with a hydrokinetic torque converter transmission employing planetary gear elements and it may be readily applied to an automotive vehicle power train to form a driving connection between the vehicle engine and the traction wheels. The relative motion of the planetary gear elements is controlled by fluid pressure operated transmission control clutches and brakes which may be selectively energized to condition the transmission for operation in any of the various operating speed ranges thus providing several power delivery paths of varying torque multiplication ratio.

According to a principal feature of our invention, we have provided a multiple speed, power transmission mechanism employing control components capable of conditioning the planetary gear elements of the transmission for the transfer of torque from the traction wheels to the vehicle engine thereby providing for engine braking while coasting.

We prefer to employ a hydrokinetic torque transmitting unit having an engine driven pump member and two cooperating turbine members drivably coupled to the power input members of the planetary gear unit. When the engine is under power, driving torque is transferred from the engine driven pump to the turbine members through the medium of the circulating fluid in the torus circuit defined by the members of the hydrokinetic unit. During engine braking, power is transferred in a reverse direction through the hydrokinetic unit whereby the turbine members establish a toroidal fluid circulation which gives rise to the transfer of engine braking torque to the pump member.

The transmission control clutch and brake elements are adapted to condition the planetary elements for operation in any of a plurality of torque multiplication ratios thereby forming a driving connection between each of the turbine members and separate elements of the planetary gear train. The driving torque reaction on a first reaction gear element of the gear train resulting from the transfer of driving torque through the gear train from one of the turbines is grounded through a one-way brake. During the operating phase in which the second turbine is functioning as the principal torque transmitting member, another element of the planetary gear train acts as a torque reaction member, a suitable brake being provided for this purpose. The above-mentioned first reaction gear element overruns during this latter operating phase and the transmission operates in another gear ratio, the transition from one ratio to another being characterized by a maximum degree of smoothness without the need for sequentially energizing and de-energizing the control clutches and brakes in timed relationship.

According to a principal feature of our instant invention we have provided a control system for conditioning the transmission for a reverse torque delivery through the planetary gear train by utilizing the above-mentioned control clutches and brakes whereby one of the turbine elements will be overspeeded with respect to the tail shaft thus effecting a braking torque of a desirable magnitude. The control system includes vehicle speed and engine torque sensitive elements for conditioning the transmission control clutches and brakes for a change in the effective speed ratio between the braking turbine member and the driven tail shaft to provide the most effective degree of engine braking for any given vehicle coasting speed.

The provision of an improved transmission control system of the type above described being a principal object of our invention, it is a further object of our invention to provide a control system for a multiple speed, planetary transmission employing a hydrokinetic torque transmitting unit with multiple turbine members wherein provision is made for transmitting a braking torque through the power delivery path defined by the hydrokinetic unit and by the planetary gear elements, said gear elements causing one turbine member of the hydrokinetic unit to overspin thereby increasing the degree of engine braking.

It is another object of our invention to provide a control system as set forth in the preceding object wherein means are provided for conditioning the transmission for reverse operation while coasting in a forward direction at vehicle speeds within predetermined limits whereby the other turbine member is driven in a reverse direction with respect to the direction of rotation of the pump member.

It is a further object of our invention to provide a control system as above set forth wherein engine torque sensitive means are provided for conditioning the transmission for a forward driving torque when the power demands of the engine are increased during a coasting operation within the above-mentioned vehicle speed limits, the pressure forces acting on the control elements giving rise to the aforementioned reverse turbine rotation being overruled in this instance by an engine torque sensitive signal.

It is a further object of our invention to provide a control system for a multiple speed, power transmission employing a hydrokinetic unit wherein provision is made for varying the capacity of the transmission structure for delivering an engine braking torque through the power delivery train defined by the hydrokinetic unit and by the planetary gear elements, the degree of engine braking being determined by the engine braking requirements.

It is a further object of our invention to provide an automatic, power transmission control mechanism which is simple in construction and operation and which may be readily adapted to be used with a variety of hydrokinetic power transmissions of known construction.

For the purpose of more particularly describing the principal features of our invention, reference will be made to the accompanying drawings wherein.

Figure 1:
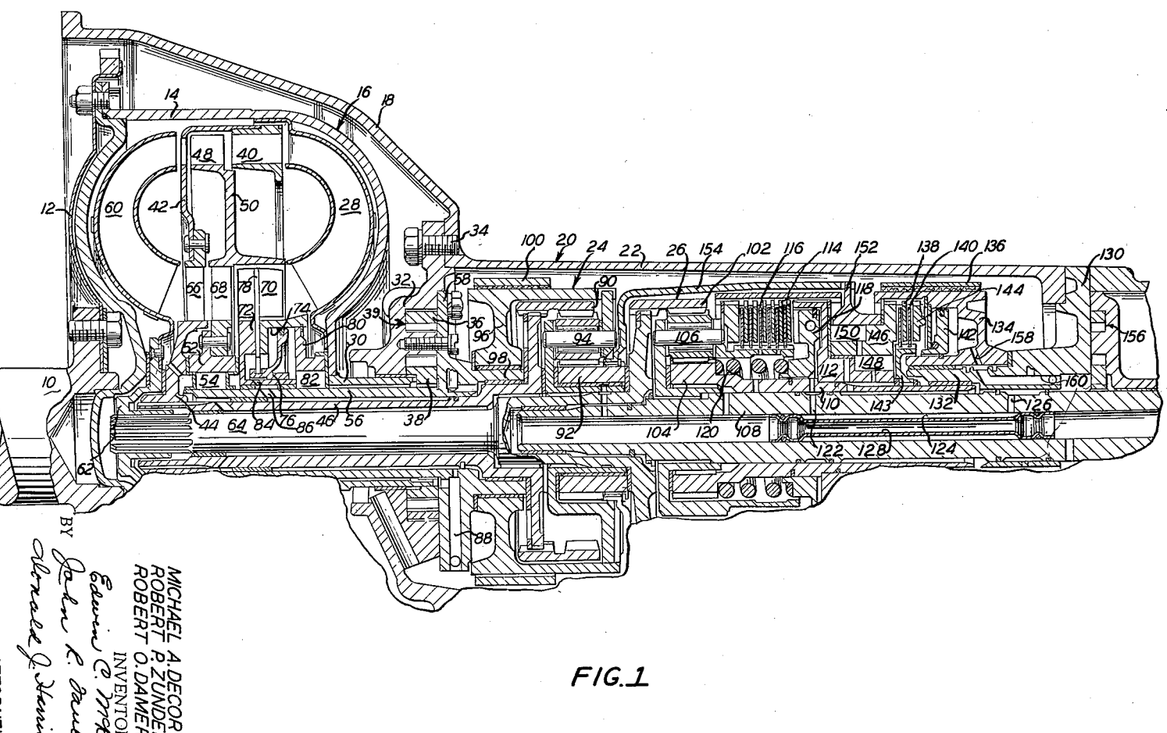
FIGURE 1 shows a longitudinal cross sectional assembly view of a double turbine hydrokinetic torque converter transmission employing clutch and brake controlled planetary gear elements.

The transmission structure illustrated in FIGURE 1 has been disclosed in the co-pending application of James Knowles, Serial No. 616,878, filed October 18, 1956, now Patent No. 2,855,803, which is assigned to the assignee of our instant invention, and reference may be had thereto for the purpose of supplementing our instant disclosure.

Referring first to FIGURE 1, reference numeral 10 is used to designate a flanged engine crankshaft which may be joined as indicated to a flexible drive plate 12, the latter forming a driving connection between the crankshaft 10 and a pump shell 14 which defines a portion of the hydrokinetic torque converter unit generally designated by numeral 16. The torque converter unit 16 is enclosed by a transmission bell housing 18 which in turn forms a part of the transmission casing generally designated by numeral 20. The casing 20 includes an elongated, relatively reduced diameter portion 22 enclosing a pair of planetary gear units generally designated by numerals 24 and 26, together with the transmission control clutches and brakes later to be described.

The hydrokinetic torque converter unit 16 includes a bladed pump member 28 drivably connected to the drive plate 12 by means of the aforementioned pump shell 14. The hub section of pump shell 14 is positively joined to an axially extending sleeve shaft 30 which may be journaled as indicated within an axially extending opening formed in a transversely situated supporting wall 32. The wall 32 is joined to the transmission casing 20 by means of bolts 34 and it is recessed as indicated to define a pump chamber within which gear pump elements 36 and 38 of a positive displacement pump 39 are mounted, the external gear 38 being drivably keyed to the sleeve shaft 30.

A first or primary bladed turbine member is designated by numeral 40 and the bladed portion thereof is located at a radially outward region adjacent the pump exit section. The primary turbine includes a support plate 42 which may be positively joined to a turbine hub 44, the latter being splined to a power delivery sleeve shaft 46 extending axially as indicated.

The hydrokinetic torque converter unit 16 further includes a primary reactor member identified in FIGURE 1 by numeral 48 and it is positioned with the bladed outer periphery thereof adjacent the exit section of the primary turbine member 40. The primary reactor member further includes a support 50 joined to a reactor hub 52 which defines the outer race for a one-way clutch 54. The inner race for the clutch 54 is a relatively stationary stator sleeve shaft 56 and which extends from a pump closure plate member 58 bolted to the wall 32. The clutch 54 will permit relative rotation of the stator member 48 in one direction with respect to the stator shaft 56 but will prevent rotation of the same in the opposite direction.

The secondary turbine member is shown in FIGURE 1 at 60 and it is shrouded as indicated with the outermost shroud being joined at the radially inward portion thereof to a turbine hub member 62. The hub member 62 is positively splined to a centrally disposed power delivery shaft 64.

The turbine hub 44 and the reactor support member 50 include radially disposed strut sections 66 and 68, respectively, in the region of the torus flow path, said sections 66 and 68 being disposed at angularly spaced locations to provide a minimum of interference with the toroidal fluid circulation.

A secondary reactor member is designed by numeral 70 and is situated with the bladed portion thereof adjacent the radially inward inlet section of pump member 28 on the downstream side of the outlet section of the secondary turbine member 60. The secondary reactor member 70 includes a hub 72 which defines an annular recess 74 within which is slidably positioned an axially movable piston 76. The individual reactor blades of the secondary reactor 70 are each mounted on separate radially extending pins 78 which extend radially within the cavity 74 as indicated. The radially inward ends of the pins 78 may be offset and received within a circular groove formed in the piston 76 whereby the blades of the secondary reactor 70 are adjustably positioned about a radial axis as the piston 76 is shifted axially within the annular cylinder defined by the recess 74. A closure member 80 is positioned adjacent the piston 76 and one-way clutch elements 82 may be positioned between the closure member 80 and relatively stationary stator shaft 56 thereby braking the secondary stator member against rotation in one direction while permitting rotation in the other direction. Fluid pressure may be admitted to one side of the annular piston 76 through passages 84 and 86 formed in the reactor hub 72 and the stator shaft 56 respecitvely and through the annular space defined by the co-axially disposed shafts 46 and 56. This latter space communicates with a radially extending passage 88 formed in the wall 32. Fluid pressure is effective to adjust the piston 76 thereby causing the secondary stator blades to assume either a high performance position or a low performance position, the latter providing increased efficiency at the high speed ratios and the former providing for increased torque ratio at relatively low speed ratios.

The planetary gear unit 24 includes a ring gear 90, a sun gear 92 and a planet gear carrier 94, the latter carrying a plurality of planet pinions engageable with the ring gear 90 and the sun gear 92. The carrier 94 is positively coupled to a friction brake drum 96 journaled on an extension 98 of the relatively stationary pump closure plate member 58. The carrier 94 may be selectively braked by a brake band 100 extending about the periphery of brake drum 96. A suitable pressure operated servo may be used for energizing the brake band 100 as will subsequently be described.

The ring gear 90 is drivably connected to sleeve shaft 46 and carrier 94 is drivably connected to the central power delivery shaft 64, said shafts 46 and 64 being concentrically mounted and extending through the aforementioned wall 32.

The shaft 64 is also drivably coupled to the ring gear 102 of the second planetary gear unit 26 as indicated. The planetary gear unit 26 further includes a sun gear 104 and a planet gear carrier 106, the latter journaling a plurality of planet gears engageable with ring gear 102 and sun gear 104. Carrier 106 is positively coupled to a power output shaft 108 extending rearwardly from the planetary gear units 24 and 26.

The sun gear 104 is formed integrally with the sleeve shaft 110 concentrically journaled about the power output shaft 108. Shaft 110 may be positively splined to a clutch member 112 carrying a plurality of friction clutch discs 114. Mating clutch discs 116 are carried by the carrier member 106. The clutch member 112 and shaft 110 define an annular cylinder within which a piston 118 is situated and it may be urged under fluid pressure into engagement with the assembly of clutch discs 114 and 116 to form a driving connection between carrier 106 and the sun gear 104 of the planetary gear unit 26. A suitable return spring 120 may be provided for de-energizing the clutch disc assembly. The fluid pressure passage used for supplying fluid pressure to the working chamber defined by the piston 118 and the cooperating annular cylinder is shown in part at 122, 124 and 126. This fluid pressure passage is defined in part by a hollow bore in power output shaft 108 and a baffle element 128 is received within the bore to define an annular space through which fluid is distributed.

The transmission casing 22 includes a transverse end wall section 130 having an axially extending extension 132 on which brake member 134 is journaled. Friction brake band 136 encircles the brake member 134 as indicated and a fluid pressure operated servo may be used to energize brake band 136 as will subsequently be described. One or more clutch plates 138 may be carried by a brake member 134 and cooperating clutch plates 140 may be carried by a clutch member 143 positively splined to shaft 110. The assembly of clutch discs 138 and 140 may be urged into driving engagement by a piston 142 slidably disposed within an annular cylinder defined by the brake member 134, the fluid pressure force for the piston 142 being transferred to a multiple clutch disc assembly through a coned clutch spring 144. A clutch plate backup member 146 is carried by brake member 134 and it provides a circular outer race for one-way clutch elements 148 and a circular inner race for one-way clutch elements 150, the clutch elements 148 forming a one-way driving connection between member 146 and clutch member 112. The one-way clutch elements 150 act between the member 146 and an outer race member 152 which may be drivably connected to the sun gear 92 of a forward planetary gear unit 24 by means of a driving member 154. The multiple disc clutch assembly shown in part at 138 and 140 may be energized by supplying fluid pressure to one side of movable piston 142 through a passage shown in part at 158 and 160.

The positive displacement gear pump 156 is joined to the end wall section 130 and the driving gear element thereof is positively connected to power output shaft 108 as indicated. The front pump shown at 36 and 38 and the rear pump 156 form a part of the control valve circuit illustrated in FIGURE 2 as will subsequently be explained.

The transmission structure illustrated in FIGURE 1 is capable of being conditioned for three forward drive speed ratios and a reverse drive. To obtain a low speed, high torque multiplication ratio, the brake band 136 is energized thereby anchoring brake member 134 and member 146. When operating from a standing start, driving torque will be transferred from crankshaft 10 and the crankshaft driven pump member 28 to the turbine member 40 thereby driving the ring gear 90 of the front planetary unit 24. During stall and during low speed ratio operation, a major portion of the driving torque is obtained from the primary turbine 40 since the blade geometry of the secondary turbine member 60 and the absolute velocity vectors are such that the torus flow which exists under low speed ratio operating conditions may not be efficiently utilized.

The torque reaction of the front planetary gear unit 24 is taken by the sun gear 92 and transmitted through one-way brake 150 to anchored brake member 146. The carrier 94 for the front planetary gear unit 24 is driven in a forward direction thereby causing ring gear 102 of the rear planetary unit 26 to also rotate in a positive direction at a reduced speed ratio. The sun gear 104 for the rear planetary gear unit 26 serves as a reaction member and reaction torque thereon is transmitted through one-way brake 148 to anchored brake member 146. The carrier 106 for the rear planetary gear unit 26 thus serves as a power output member and it drives the power output shaft 108 in a forward direction at a reduced speed with respect to the speed of the crankshaft 10.

When the overall speed ratio begins to increase, a larger percentage of the effective driving torque is supplied by the secondary turbine 60 which is directly connected to a ring gear 102 of the rear planetary gear unit 26. At some predetermined ratio between the effective torque of the turbine member 60 and the torque on the turbine member 40, the sun gear 92 of the front planetary gear unit 24 begins to overrun since the torque reaction acting thereon is in a reverse direction, the one-way brake 150 accommodating such an overrunning motion. Thereafter the entire speed reduction in the planetary gear portion of the transmission mechanism is obtained in the rear planetary gear unit 26. It is thus apparent that a smooth transition takes place between the lowest gear reduction ratio and the intermediate gear reduction ratio and it is not necessary to energize or de-energize any of the transmission clutches and brakes to effect such a transition.

At some predetermined speed ratio the multiple disc clutch assembly shown in part at 114 and 116 may be energized thereby locking together the elements of the rear planetary gear unit 26 to provide a 1:1 drive ratio between the turbine 60 and the power output shaft 108.

The one-way brake 148 permits the rear sun gear 104 of the rear planetary unit 106 to overrun under these conditions. It is thus seen that a shift from the intermediate speed ratio to the highest speed ratio may be obtained simply by energizing a single clutch and no synchronizing or timing problems are involved.

Primary and secondary stators 48 and 70 cooperate with the primary and secondary turbine members 40 and 60 to provide a torque multiplication within the torque converter range. However, when the coupling points are reached for the primary and secondary turbines, the cooperating stator member for each of the turbine members may be caused to overrun in the direction of rotation of the pump member 28, the one-way brakes 54 and 82 accommodating such an overrunning motion.

Reverse operation may be obtained by energizing the multiple disc clutch assembly shown at 138 and 140 and by energizing brake band 100. It is seen that the secondary turbine 60 becomes anchored and a driving torque will be delivered from the secondary turbine member 40 to the ring gear 90 of the front planetary unit 24. Since the carrier 94 is anchored by brake band 100, the sun gear 92 of the planetary unit 24 will be driven in a reverse direction. The reverse motion of sun gear 92 will be transmitted through drive member 154 and one-way brake 150 and through the energized clutch assembly 138 and 140 to sleeve shaft 110 and to the sun gear 104 of the rear planetary gear unit 26. Since the ring gear 102 of the rear planetary unit 26 is anchored by the brake band 100, the carrier 106 will be driven in a reverse direction thereby driving the power output shaft 108 in a reverse direction at a reduced speed ratio.

To obtain hill braking the clutch disc assembly shown in part at 138 and 140 is energized thereby providing a power flow path for a reverse delivery of torque from the power output shaft 108 to one or the other of the turbine members 40 or 60. Hill braking may be obtained in multiple stages, each stage being characterized by a different hill braking ratio. The first hill braking stage may be obtained by energizing the multiple disc clutch assembly shown at 138 and 140 and the forward drive brake band 136. Reverse torque will therefore be transferred from power output shaft 108 to the carrier 106, and since the sun gear 104 of the rear planetary unit 26 is anchored, the ring gear 102 and the power delivery shaft 64 will be overspeeded thereby overspeeding the turbine 60 in the direction of rotation of the pump 28. A second hill braking stage may be obtained by releasing brake band 136 and by energizing brake band 100 while the multiple disc clutch assembly 138 and 140 remains energized. The reverse torque will then be transferred from power output shaft 108 to carrier 106 of the rear planetary gear unit 26. Since the ring gear 102 is anchored, the sun gear 104 will be driven in a forward direction and this motion will be transmitted through shaft 110, through engaged clutch assembly 138 and 140 and through one-way brake 150 to the sun gear 92 of the front planetary gear unit 24. Since the carrier member 94 of the planetary gear unit 24 is anchored, the ring gear 90 will thus be driven in a reverse direction and this will cause the primary turbine 40 to be driven in a reverse direction with respect to the direction of rotation of the pump member 28, the secondary turbine 60 being anchored by the brake 100 as previously indicated.

Figure 2:
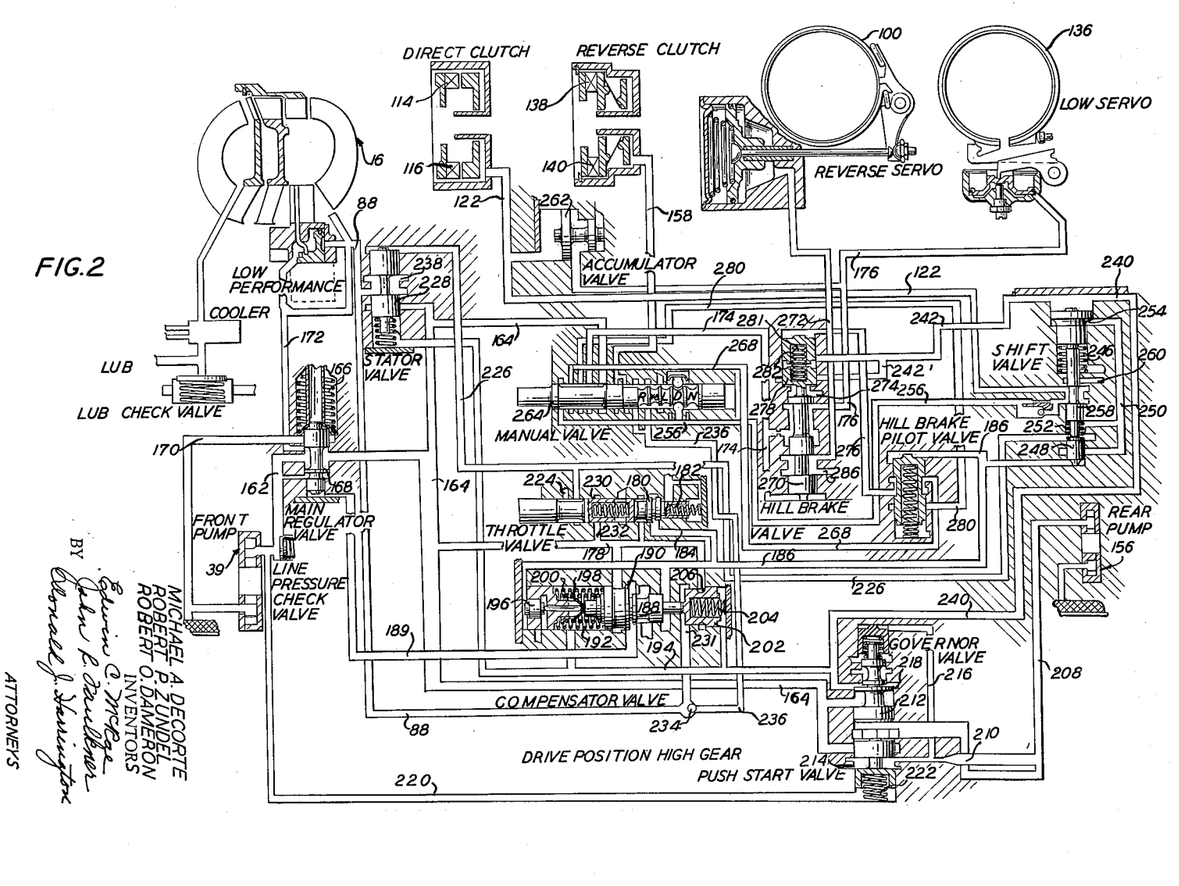
FIGURE 2 is a schematic representation of a control valve circuit embodying the principals of our invention and which is particularly adapted to be used with the transmission structure of FIGURE 1.

Referring next to the schematic control circuit diagram of FIGURE 2, the engine driven front pump 39 is effective to deliver fluid pressure to a main regulator valve through a control pressure passage 162 which communicates with the control pressure distributor passage 164 extending to an operator controlled manual valve as indicated. The main regulator valve includes a spool valve element biased by a valve spring 166 and it is subjected to a fluid pressure force opposing the force of valve spring 166 by reason of the differential area formed between adjacent valve lands at 168. Excess pump pressure is exhausted through the main regulator valve into a low pressure passage 170. A converter supply passage 172 communicates with the main regulator valve at a location adjacent control pressure passage 162 and it communicates with the hydrokinetic torque converter unit 16 as indicated.

The manual valve may be adjustably positioned to any of several operating positions identified in FIGURE 2 by the letters "R," "HB," "L," "D," and "N" which respectively identify the positions corresponding to Reverse, Hill Braking, Low, Drive, and Neutral. The position indicated in FIGURE 2 is the drive range position and the various elements of the control circuit are shown in the position which corresponds to the forward driving range and the high speed, direct drive torque multiplication ratio. The passage 164 communicates with the passage 174 extending to a hill brake valve as indicated which in turn establishes communication between passage 174 and passage 176, the latter extending to the low servo which operates the forward drive brake band 136.

Line pressure passage 164 communicates with the throttle valve through a passage 178 at a point adjacent throttle valve land 180. The throttle valve is biased in one direction by a throttle valve spring 182 and it is urged in the opposite direction by means of a suitable engine throttle linkage mechanism interconnecting the engine throttle and the valve element of the throttle valve shown in FIGURE 2. A throttle pressure passage 184 extends from the throttle valve at a location adjacent valve land 182 and the degree of communication between passages 178 and 184 is determined by the position of the throttle valve element which is established by the engine throttle setting. At advanced throttle settings the degree of communication between passage 178 and 184 is increased and the resulting pressure established in passage 184 is correspondingly increased. Since the engine throttle setting is an indicator of engine torque demand, the magnitude of the pressure in passage 184 will be a function of engine torque demand. For purposes of this description the pressure established in passage 184 by the throttle valve will be referred to as throttle pressure.

Passage 184 communicates with passage 186 which in turn extends to opposed sides of the compensator valve assembly, said assembly including a valve spool 188 situated within the main valve cavity. The compensator valve cavity communicates with line pressure passage 178 and with the compensator pressure passage shown at 189, the degree of communication between passages 178 and 189 being regulated by a valve land 190 of the valve spool 188.

A valve spring 192 is included in the compensator valve assembly and it is adapted to urge the compensator valve element 188 in a right-hand direction as viewed in FIGURE 2 to oppose the pressure force of the throttle valve pressure acting on the right-hand side of the valve spool 188. In addition, the valve spool 188 may be subjected to a vehicle speed sensitive pressure, hereinafter referred to as governor pressure, for biasing the same in a right-hand direction as viewed in FIGURE 2 to supplement the action of valve spring 192, said governor pressure being distributed to the compensator valve through a governor pressure passage shown at 194. It is thus apparent from an inspection of FIGURE 2 that an increase in governor pressure for any given throttle pressure will increase the degree of communication between line pressure passage 178 and compensator pressure passage 189 thereby increasing the operating level of the compensator pressure. Conversely, an increase in throttle pressure for any given governor pressure will cause a corresponding decrease in the magnitude of the compensator pressure passage 189. The passage 189 communicates with the main regulator valve and is effective to urge the latter in an upward direction to oppose the biasing force of the regulator valve spring 166. It is thus apparent that the magnitude of the compensator pressure will influence the regulating characteristics of the main regulator valve so that an increase in the magnitude of the compensator pressure will cause a decrease in the operating level of the control pressure while a decrease in the magnitude of the compensator pressure will cause a corresponding increase in the control pressure level. The magnitude of the line pressure will thus always be sufficient to provide the required torque capacity under any given driving condition. However, the magnitude of the control pressure level is maintained at a value which is in excess of that which is required by the various transmission clutch and brake servos and a rough or abrupt shift when the clutch or brake servos are energized is thus avoided.

A valve plunger 196 is situated on one side of the compensator valve assembly and is subjected to throttle pressure as shown. The valve plunger 196 is urged in a left-hand direction as viewed in FIGURE 2 by an inner valve spring 198 acting between compensator valve spool 188 and valve spring seat 200. A spacer is interposed between the valve seat 200 and the valve plunger 196.

At lower throttle pressure values, the valve plunger 196 assumes a limiting left-hand position as viewed in FIGURE 2 under the influence of inner valve spring 198 and the throttle pressure force acting thereon has no influence on the regulating characteristics of the compensator valve spool 188. The magnitude of the compensator pressure is thus varied in proportion to the engine throttle setting as previously explained through the movement of the engine throttle at reduced settings. However, at advanced throttle settings the variation in engine torque during continued movement of the engine throttle is made negligible and it is thus desirable to render the compensator valve insensitive to changes in engine throttle setting during movement of the engine throttle at more advanced positions. Accordingly, the compensator valve is calibrated so that the valve plunger 196 will become unseated at any throttle setting in advance of a preselected limiting value (e.g. 60% wide open throttle). When the biasing force of the inner valve spring 198 is thus overcome, the throttle pressure force acting on the valve plunger 196 is transmitted directly to the compensator valve spool 188 and opposes the compensator pressure force acting on the valve spool in the opposite direction. The net force acting on valve spool 188 is thus zero and any further change in engine throttle setting beyond the 60% value will not be accompanied by a corresponding change in the magnitude of the compensator pressure.

Another valve plunger 202 is situated on the opposite side of the valve spool 188 and is urged into engagement with the latter under the influence of the valve spring 204, valve spool 188 having an extension as indicated which is engageable with plunger 202. Valve plunger 202 has an annular groove formed thereon defining a differential area 206 which is subjected to line pressure from line pressure passage 178, the plunger 202 thereby being biased in a right-hand direction as viewed in FIGURE 2. Plunger 202 is further subjected to governor pressure which tends to urge the same in a left-hand direction as viewed in FIGURE 2 to supplement the biasing force of valve spring 204.

When the vehicle speed continues to increase, the magnitude of the governor pressure increases accordingly. However, when the vehicle speed increases beyond a preselected value for any given throttle setting it becomes desirable to overrule the influence of the governor pressure on the regulating characteristics of the compensator valve since the effect of such an increase in the vehicle speed on the magnitude of the control pressure level would cause the latter to assume a value which would be too low to maintain the required torque capacity of the transmission control clutches and brakes. Accordingly, the dimensions of the valve plunger 202 are calibrated so that it will move into engagement with the valve spool 188 whenever the vehicle speed increases beyond a preselected value for any given throttle pressure. After the plunger 202 engages valve element 188, the governor pressure force acting on plunger 202 is transmitted directly to the valve spool 188 thus opposing and canceling the effect of the governor pressure acting on the left side of the valve spool 188 as viewed in FIGURE 2, the net effect of the governor pressure thereafter being zero. The value of the governor pressure at which the valve plunger 202 will be urged against the valve spool 188 will, of course, be dependent upon the magnitude of the line pressure which then exists since the line pressure acts on valve plunger 202 in opposition to governor pressure as previously explained.

The rear pump 156 functions as a source of governor pressure and the discharge side thereof is connected to the governor valve by means of a passage 208, the rear pump discharge pressure acting on the lower side of governor valve land 212 to urge the governor valve in an upward direction as viewed in FIGURE 2. A venturi section is situated in parallel relationship with respect to passage 208 and the downstream side of passage 210 communicates with an exhaust port 214 as indicated. The pressure existing in the region of the throat of the venturi 210 is conducted to the upper side of the governor valve through a passage 216. Line pressure passage 164 extends to the governor valve and communicates therewith at a point adjacent governor valve land 218, said valve land controlling the degree of communication between the aforesaid line pressure passage 164 and the aforementioned governor pressure passage 194. It is thus apparent that the total pressure head supplied by tail shaft driven rear pump 156 will be caused to act on the lower end of the governor valve and static pressure in the throat region of the venturi section 210 is caused to act on the upper end of the governor valve. Since the difference between total pressure head and the static pressure head is equal to the velocity pressure head, the net pressure force acting on the governor valve will be equal to that force which is due to velocity pressure.

A pressure passage 220 extends from the discharge side of front pump 39 to the lower side of the push start valve to urge the latter in an upward direction as viewed in FIGURE 2. If the engine should stall the front pump 39 would be ineffective for supplying line pressure. In order to obtain a push start when the engine stalls, it is necessary to condition the transmission for reverse torque delivery. Under these conditions the rear pump 156 will be driven in a positive direction thereby causing the push start valve to move in a downward direction under the influence of the rear pump discharge pressure, the latter overcoming the biasing force of a push start valve spring 222. Communication is thus established between passage 208 and control pressure passage 164 thereby supplying the latter with the required potential to energize the various clutch and brake servos. The rear pump discharge pressure is sufficient to move the push start valve since pressure passage 220 is not pressurized under these push start conditions.

Governor pressure in passage 194 is distributed to the lower end of the stator valve and is effective to urge the latter in an upward direction as viewed in FIGURE 2. The upper end of the stator valve communicates with an exhaust port 224 in the throttle valve chamber through the passage 226. Control pressure passage 164 communicates with the stator valve as indicated and communication between passage 164 and the aforementioned passage 88 extending to one side of the shiftable reactor servo piston is controlled by stator valve land 228. If it is desired to shift the above described two-stage reactor into a high performance position, the throttle valve may be moved until valve land 230 uncovers a line pressure port 232 to establish communication between throttle pressure passage 178 and passage 226, the exhaust port 224 being closed simultaneously with movement of the valve land 230 beyond the line pressure port 232. The engine throttle will have assumed a wide open position under these conditions and the stator valve will immediately assume a downward position by reason of the line pressure force acting on the stator valve against the opposing force of the stator valve spring. The stator valve will thus provide communication between passage 164 and 88 thereby shifting the stator blade servo into the high performance position.

Whenever the passage 88 is thus pressurized to obtain high performance in the hydrokinetic torque converter, the torque capacity of the transmission control clutches and brakes should be correspondingly increased. Accordingly the pressure in passage 88 is conducted to the compensator valve through a branch passage 231 thereby causing line pressure to act upon the extension on compensator valve spool 188 to supplement the biasing action of the throttle pressure. This influences the regulating characteristics of the compensator valve to provide a decreased compensator pressure in passage 189 and this in turn causes an increase in the magnitude of the line pressure by reason of the influence of the decrease in compensator pressure on the main regulator valve as previously described. This increase in line pressure provides the required increase in the torque capacity of the transmission control clutches and brakes during operation in the high performance range. A shiftable check valve 234 is situated at the juncture of passages 88 and 231 to prevent line pressure from entering passage 236, the latter extending to the manual valve as indicated.

When the throttle valve is moved to the normal cruising position corresponding to a reduced engine throttle setting, the passage 226 becomes exhausted thereby causing the stator valve to assume the position shown in FIGURE 2 and this in turn causes passage 88 to become exhausted through exhaust port 238 communicating with the stator valve. Converter charge pressure will thus return the piston of the adjustable stator to the cruising position. It is thus apparent that the stator valve element is sensitive to vehicle speed and is thereby effective to determine the vehicle speed at which a shift into the low performance range may be effected.

Governor pressure is distributed to the upper end of the shift valve through a governor pressure passage 240 which in turn communicates with a passage 242 extending to the upper end of the hill brake valve as indicated.

The shift valve is comprised of a multiple land valve spool which is urged in an upward direction by a shift valve spring 246. The throttle pressure passage 186 extends to the lower end of the shift valve chamber occupied by the shift valve element and a modulator valve plug 248 is situated at this location for the purpose of controlling the degree of communication between throttle pressure passage 186 and a modulated throttle pressure passage 250, the pressure differential existing between passages 186 and 250 being determined by the calibration of the valve spring 252 interposed between the shift valve element and the modulator valve plug 248. The modulated throttle pressure in passage 250 acts on the lower end of the shift valve element and on the differential area produced by adjacent shift valve lands as designated by numeral 254.

A passage 256 extends from the manual valve to the valve chamber occupied by the shift valve element and it communicates through the shift valve chamber with the aforementioned passage 122 extending to the direct drive clutch servo. When the shift valve element assumes the upward position under the influence of the shift valve spring and the biasing force produced by the modulated throttle pressure, valve land 258 on the shift valve element blocks communication between passages 256 and 122 and the direct drive clutch servo is exhausted through an exhaust port 260 located in the shift valve chamber. However, when the vehicle speed and the governor pressure are sufficiently great to cause the shift valve element to assume the position shown in FIGURE 2 against the opposing force of the shift valve spring and the modulated throttle pressure force, the transmission will be conditioned for high speed direct drive, the actuation of other clutch or brake servos being unnecessary. As previously explained, the shift valve may be calibrated so that such a shift from the low speed range to the high speed range will occur after the secondary turbine and the cooperating pump and reactor members enter the coupling range.

In order to cushion the application of the direct drive clutch an accumulator valve is provided as indicated and it is comprised of a valve cavity within which a compound piston 262 is slidably situated. Line pressure is caused to act on one side of the main piston portion and clutch pressure is caused to act on the other side of the piston. It is thus apparent that a gradual pressure build-up will occur after the shift valve assumes the high speed position since the accumulator valve piston will provide a pressure chamber of varying volume. Since the accumulator piston is acted upon by line pressure, the pressure level at which a gradual variation in clutch pressure will take place will be dependent upon the operating pressure level established by the main pressure regulator valve.

When the manual valve is shifted by the vehicle operator to the low range position identified by the letter "L," the passage 256 becomes exhausted since valve land 264 on the manual valve element uncovers passage 256 to establish communication between the latter and the low pressure exhaust region. It is thus apparent that passage 122 will be continuously exhausted regardless of the operating position of the shift valve element and the direct drive clutch will continue to remain de-energized. The rear planetary gear unit 26 will thus be effective at all times to provide a torque multiplication ratio in excess of unity.

Figure 3:
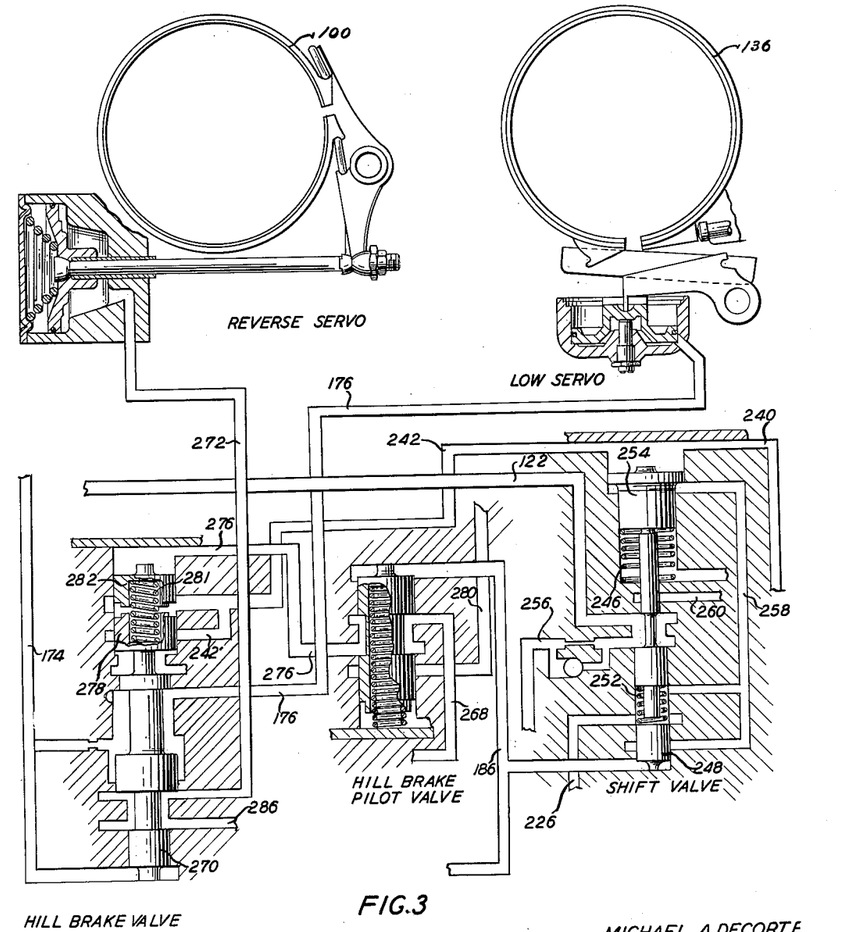
FIGURE 3 is an enlarged view of a portion of the control valve circuit of FIGURE 2.

To obtain reverse drive the manual valve may be shifted to the reverse position as indicated by the letter "R" in FIGURE 3. Line pressure is distributed to passage 158 extending to the reverse drive clutch, the passage 256 being exhausted as previously described. In addition, valve land 264 on the manual valve element uncovers passage 268 which communicates with the manual valve as indicated, said passage 268 extending through the hill brake pilot valve to passage 276 communicating with the upper end of the hill brake valve chamber. The hill brake valve will assume an upward position under these conditions under the influence of a line pressure force acting on the lower land 270 of the hill brake valve element. The hill brake valve will thus establish communication between passage 174 and passage 272 extending to the reverse drive servo. The low speed servo will be exhausted through passage 176 and through an exhaust port 274 communicating with the hill brake valve chamber. The transmission is thus conditioned for reverse drive operation since both the reverse clutch and the reverse servo are energized as previously explained.

During operation in reverse, the manual valve element uncovers passage 236 thereby providing communication between the passage 236 and passage 164. Control pressure is thus admitted to the compensator valve assembly through passage 231 and the check valve 234 assumes a leftward position to prevent line pressure from pressurizing passage 88. Control pressure is thus caused to act on the extended end of the compensator valve element 188 to supplement the biasing action of the throttle pressure. This causes a decrease in the magnitude of the effective compensator pressure in the passage 189 and the main regulator valve is thus caused to establish a line pressure of increased magnitude thereby conditioning the transmission control clutches and brakes for operation at the increased torque which accompanies reverse operation.

Under certain driving conditions a so-called downshift may be obtained while the direct drive clutch remains energized and while the shift valve element retains a downward position. This may be accomplished by increasing the throttle setting so that the engine will operate at a higher torque. If the corresponding engine speed change is accompanied by an increased torque, the percentage of this increased torque which is taken by the primary turbine member 40 will initially be greater than the percentage of the increased torque taken by the secondary turbine member 60. This will cause the ring gear 90 to overspeed the carrier 94 and this in turn will cause a reverse torque reaction on the sun gear 92 which will be transferred to the casing 20 through one-way brake 150. The increased turbine torque and the torque multiplication thus obtained in the front planetary gear unit 24 will cause an increased overall torque multiplication ratio. A downshift may also be obtained by increasing the throttle setting until the magnitude of the throttle pressure in passage 186 is sufficient to establish an upward force on the shift valve element which will overrule the downwardly directed governor pressure force.

It may be observed from FIGURE 2 that line pressure is caused to act on a differential area intermediate the adjacent valve lands of the shift valve element thereby creating a downward force whenever the shift valve element assumes a downward position. This produces a so-called hysteresis effect whereby a downshift is delayed until the ratio between the governor pressure forces and the throttle pressure forces is somewhat lower than the corresponding ratio at which an upshift into direct drive will occur.

If desired, a further downshift may be obtained by moving the engine throttle to a wide open position whereby the exhaust port 224 is blocked while the line pressure port 232 is uncovered. This will effect a shift of the adjustable stator to a high performance range as previously described.

To obtain hill braking operation, the manual valve may be shifted to the position indicated by the symbol "HB." This causes passages 256 and 268 to become exhausted. For purposes of illustration, it will be assumed that the vehicle is traveling under steady state, road load conditions at a relatively high speed. Under these conditions the hill brake pilot valve will assume a downward position under the influence of throttle pressure acting on the upper end thereof, said throttle pressure being supplied to the hill brake pilot valve through passage 186. As soon as hill braking is initiated, the engine throttle is relaxed and the magnitude of the throttle pressure is reduced. This permits the hill brake pilot valve to move to an upward position under the influence of the hill brake pilot valve spring.

Since passage 256 is exhausted when the manual valve is shifted to the hill brake position, the passage 122 and the direct drive clutch become exhausted through the shift valve and through the passage 256. Similarly, passage 268 is exhausted by the manual valve when the manual valve element assumes the hill brake position. Passage 268 communicates with passage 276 through the hill brake pilot valve, said passage 276 communicating with the upper end of the hill brake valve chamber. When the manual valve is in the hill brake position, passage 276 is exhausted through the end of the manual valve.

Movement of the manual valve element to the hill brake position uncovers passage 158 and permits line pressure to be distributed from passage 164 to passage 158 and to the reverse drive clutch thereby energizing the latter. This will serve to anchor the sun gear 104 of the rear planetary gear unit 26 during reverse torque delivery from the power output shaft 108 to the engine crankshaft.

A valve plunger 282 is situated in the hill brake valve chamber and control pressure is applied to the upper side of the same through passage 276 when the pilot valve element assumes an upward position and when the manual valve is in a forward driving range. Passage 276 also communicates with another control pressure passage 280 when the hill brake pilot valve assumes a downward position, said passage 280 continuing to be pressurized after the manual valve assumes a hill brake position. Governor pressure is supplied to the hill brake valve chamber through passages 240 and 242 and it acts on the upper end of the land 278 of the hill brake valve element. A valve spring 281 is situated between the hill brake valve element and plunger 282. At any speed in excess of a given value (e.g. 25 m.p.h.), the governor pressure and spring force will be sufficient to maintain the hill brake valve element in a downward position as illustrated in FIGURE 2 against the opposing upwardly directed control pressure force. It is thus apparent that during this phase of the hill braking operation continuous communication will be provided through the hill brake valve from passage 174 to passage 176 thereby maintaining the forward drive low speed servo in an energized condition. Under normal driving conditions with power being delivered from the engine crankshaft to the power output shaft 108, the hill brake valve is maintained in a downward position at all driving speeds since control pressure is caused to act on the upper end of the valve plunger 282. The hill brake valve thus functions as a pressure distributor valve.

It is thus apparent that the transmission will be conditioned for hill brake operation whenever the manual valve element is shifted to the hill brake position and a reverse braking torque will be transferred from power output shaft 108 to the carrier 106 of the rear planetary gear unit 26. Since the forward drive low speed servo is energized, the torque reaction on the sun gear 104 will be transmitted through the energized reverse clutch and through the brake band 136 to the transmission casing. The ring gear 102 of the rear planetary gear unit 26 will thus be overspeeded thereby causing shaft 64 and secondary turbine member 60 to overspeed with respect to the pump 28. The one-way brake 150 will overrun thereby preventing the sun gear 92 of the planetary gear unit 24 from acting as a reaction member. The primary turbine member 40 floats freely during this intermediate ratio engine braking operation.

When the vehicle speed falls below 25 m.p.h. during engine braking, the governor pressure in passages 240 and 242 will decrease and the governor pressure force and spring force will no longer be sufficient to overcome the upwardly directed pressure forces acting on the hill brake valve element, the latter assuming an upward position thereby causing passage 176 and the forward drive low speed servo to become exhausted through exhaust port 274. Simultaneously, passage 272 extending to the reverse drive servo will be brought into communication with the line pressure passage 174 thereby energizing the reverse drive servo. Since the reverse clutch and the reverse drive servo are both energized in this fashion, a higher degree of engine braking will be effected since the transmission will be conditioned for reverse drive. A reverse torque delivery will therefore be established from power output shaft 108 to the carrier 106. Since the reverse servo is energized, brake band 100 will anchor carrier 94 for the forward planetary gear unit 24 and the ring gear 102 for the rear planetary gear unit 26. The sun gear 104 of the rear planetary gear unit 26 will therefore be driven in the direction of rotation of the power output shaft 108 and this driving torque will be transferred through the energized reverse clutch and through overrunning brake 150 thereby driving sun gear 92 of the forward planetary gear unit 24, the ring gear 102 serving as a reaction member. Since the carrier 94 is anchored as previously mentioned, the ring gear 90 for the front planetary gear unit 94 will be driven in a reverse direction thereby driving the primary turbine member 40 in a reverse direction with respect to the pump 28, the secondary turbine 60 being braked by the brake band 100.

When the hill brake valve element moves to an upper position to effect a reverse hill braking condition, the lower end of land 278 is subjected to governor pressure by means of branch passage 242′ thereby providing a "snap action" whereby the valve element is moved quickly into position.

If the vehicle operator should desire to accelerate the vehicle when the transmission is operating in the reverse hill brake position, the accompanying increase in engine throttle setting will cause an increase in the magnitude of the throttle pressure thus causing the hill brake pilot valve to move in a downward direction against the opposing force of the pilot valve spring. This will establish communication between passages 276 and 280 thereby pressurizing the upper end of valve plunger 282 to urge the hill brake valve element in a downward direction, said passage 280 communicating with the manual valve chamber. This in turn causes the reverse drive servo to become exhausted through exhaust port 286 while simultaneously establishing communication between line pressure passage 174 and passage 176 extending to the forward drive low speed servo. The transmission is thus conditioned for intermediate ratio, forward drive operation. This automatic transition from one operating range to another eliminates any undesirable effects due to the application of a forward driving torque to the hydrokinetic unit while the transmission is in the reverse drive range. It is thus apparent that the hill braking operation occurs in two stages to provide a maximum degree of effectiveness and a high degree of smoothness.

Although we have particularly described the principal features of a preferred embodiment of our invention, we contemplate that variations may be made thereto without departing from the spirit and scope of the invention as defined by the following claims.

We claim:

1. In an automatic control system for a multiple speed, power transmission mechanism having a system of planetary gear elements defining a power delivery path between a driving member and a driven member, means for controlling the relative motion of said gear elements including a first fluid pressure operated control element that is actuated during said torque delivery through said system in one direction, a second fluid pressure operated control element that is actuated during torque delivery through said system in the opposite direction, a source of fluid pressure, conduit structure interconnecting said pressure source and said control elements, a pressure distribution valve situated in and partly defining said conduit structure, said distribution valve being movable automatically between one operating position and another upon a change in the direction of delivery of torque through the system to respectively distribute fluid pressure to said first control element while exhausting said second control element and to distribute fluid pressure to said second control element while exhausting said first control element, speed governor means drivably coupled to said driven member for establishing a control pressure signal proportional in magnitude to the speed of said driven member, pressure passage means for subjecting said distribution valve to said pressure signal for urging the latter toward one operating position, and means continuously biasing said distribution valve toward the other operating position.

2. In an automatic control system for a multiple speed, power transmission mechanism having a system of planetary gear elements defining a power delivery path between a driving member and a driven member, means for controlling the relative motion of said gear elements including a first fluid pressure operated control element engageable with one portion of said system during torque delivery through said system in one direction, a second fluid pressure operated control element engageable with another portion of said system during torque delivery through said system in the opposite direction, a fluid pressure source, conduit structure interconnecting said pressure source and said control elements, a pressure distribution valve means situated in and partly defining said conduit structure for alternately conducting fluid pressure to each of said control elements including a pressure distribution valve element movable to a first position to establish communication between said pressure source and a first of said control elements while exhausting the other control element and movable to a second position to establish communication between said pressure source and said other control element while exhausting said first control element, said valve means being movable automatically to the other of said positions upon a change in the direction of torque delivery through said system when said valve means is in one of said positions, speed governor means for establishing a control pressure signal proportional in magnitude to the speed of said driven member, a pressure passage means for subjecting said distribution valve element to said pressure signal for urging the latter toward one operating position, means continuously biasing said distribution valve element toward the other operating position, an auxiliary pressure passage communicating with said valve means and extending to a high pressure region of said control system, and a pilot valve means forming a part of said auxiliary passage for alternately interrupting and establishing distribution of fluid pressure to said distribution valve means through said auxiliary passage.

3. In an automatic control system for a multiple speed, power transmission mechanism having a system of planetary gear elements defining a power delivery path between a throttle controlled engine and a driven member, means for controlling the relative motion of said gear elements including a first fluid pressure operated control element engageable with one portion of said system during torque delivery through said system in one direction, a second fluid pressure operated control element engageable with another portion of said system during torque delivery through said system in the opposite direction, a fluid pressure source, conduit structure interconnecting said pressure source and said control elements, a pressure distribution valve means situated in and partly defining said conduit structure for alternately conducting fluid pressure to each of said control elements including a valve element movable to one position to establish communication between said pressure source and said first control element while exhausting said second control element and movable to another position to establish communication between said pressure source and said second control element while exhausting said first control element, engine throttle controlled valve means for establishing a first control pressure signal sensitive to engine throttle movement, speed governor means for establishing a second control pressure signal proportional in magnitude to the driven speed, first pressure passage means for subjecting a portion of said distribution valve means to said second control pressure signal to urge the latter toward one operating position, auxiliary pressure passage means for conducting said first control pressure signal to said pilot valve means thereby causing the same to move in response to the pressure signal force acting thereon and secondary passage means communicating with said distribution valve means and extending to a high pressure region of said control system, pilot valve means situated in and partly defining said secondary passage means for alternately establishing and interrupting communication between said pressure source and said distribution valve means in response to variations in the magnitude of said first control pressure signal.

4. The combination as set forth in claim 3 wherein said pilot valve means includes a valve spring for opposing the biasing action of said first control pressure signal.

5. In a control system for an automatic, power transmission mechanism, a source of main control pressure, two fluid pressure operated servos, conduit structure interconnecting said pressure source and said servos, a distributor valve chamber, said conduit structure including a pressure passage interconnecting said control pressure source and said valve chamber and a passage extending from said valve chamber to each servo, at least one exhaust port communicating with said valve chamber, a movable distributor valve element situated in said valve chamber, passage means for subjecting said movable valve element to said main control pressure for actuating the same, said passage means including a pilot valve element adapted to selectively interrupt and establish communication between said pressure source and said valve chamber, a pressure signal source for establishing a variable control pressure proportional in magnitude to an operating parameter of said mechanism, and auxiliary passage means for subjecting said pilot valve element to said variable control pressure to actuate the same whereby the valve actuating forces acting on said distributor valve element are controlled by said pilot valve element.

6. In a control system for an automatic, power transmission mechanism having torque delivery gear elements, a source of fluid pressure, means for controlling the relative motion of said gear elements including a first fluid pressure operated servo that is actuated during torque delivery in one direction, a second fluid pressure operated servo that is actuated during torque delivery in the opposite direction, primary conduit structure interconnecting said fluid pressure source and said servos including a fluid pressure operated pressure distributor valve means for selectively directing fluid pressure to said first and second servos, secondary conduit structure including means for subjecting a portion of said distributor valve means to fluid pressure for actuating the same, and a pilot valve mechanism situated in and forming a portion of said secondary conduit structure, said pilot valve mechanism including a movable valve element adapted to alternately open and close said secondary conduit structure, a control pressure signal source, passage means for subjecting said movable valve element to said pressure signal, and spring means for biasing said movable valve element in opposition to the force produced by said pressure signal.

7. In a control system for an automatic, power transmission mechanism having gear elements capable of delivering power from an engine to a driven member, a source of main fluid pressure, means for controlling the relative motion of said gear elements including a first fluid pressure operated servo that is actuated during torque delivery in one direction, a second fluid pressure operated servo that is actuated during torque delivery in the opposite direction, primary conduit structure interconnecting said fluid pressure source and said servos including a distributor valve means for selectively and alternately directing fluid pressure to each of said first and second servos, secondary conduit structure interconnecting said fluid pressure source and a portion of said distributor valve means, a pilot valve mechanism situated in and forming a portion of said secondary conduit structure, said pilot valve mechanism including a valve element adapted to be moved to either of two operating positions to respectively and alternately open and close said secondary conduit structure, a source of engine torque demand sensitive pressure, and passage means for subjecting said valve element to said torque demand sensitive pressure for actuating the same.

8. The combination as set forth in claim 7 wherein said pilot valve mechanism includes a valve spring engageable with said valve element and adapted to urge the same toward one of said two operating positions.

9. In a control system for an automatic, power transmission mechanism having gear elements capable of delivering power from an engine to a driven member, a source of fluid pressure, means for controlling the relative motion of said gear elements including first and second fluid pressure operated servos adapted to condition said transmission for torque delivery in one direction and a third fluid pressure operated servo that is actuated during torque delivery in the opposite direction, primary conduit structure interconnecting said fluid pressure source and said servos including a distributor valve means for selectively directing fluid pressure to said first and third servos, said primary conduit structure further including manually operable valve means for selectively and simultaneously directing fluid pressure to said second servo and to said distributor valve means, secondary conduit structure interconnecting said fluid pressure source and a portion of said distributor valve means, and a pilot valve mechanism situated in and forming a portion of said secondary conduit structure, said pilot valve mechanism including a valve element adapted to be moved to either of two operating positions to respectively and alternately open and close said secondary conduit structure, a source of engine torque demand sensitive pressure, and passage means for subjecting said valve element to said torque demand sensitive pressure for actuating the same.

10. In a control system for an automatic power transmission mechanism including gear elements capable of delivering power from an engine to a driven member, a source of main control pressure, means for controlling the relative motion of said gear elements including a first fluid pressure operated servo that is actuated during torque delivery in one direction, a second fluid pressure operated servo that is actuated during torque delivery in the opposite direction, primary conduit structure interconnecting said fluid pressure source and said servos including a distributor valve means for selectively and alternately directing fluid pressure to each of said first and second servos, said distributor valve means including a distributor valve chamber and a distributor valve element movably disposed in said chamber, a valve plunger situated in said valve chamber on one side of said valve element along the path of movement thereof, a branch passage defining a part of said primary conduit structure and communicating with said distributor valve chamber whereby said distributor valve element is subjected to main control pressure, secondary conduit structure interconnecting said pressure source and said distributor valve chamber for subjecting said valve plunger to said main control pressure, a pilot valve mechanism situated in and forming a portion of said secondary conduit structure, said pilot valve mechanism including a pilot valve element adapted to move to either of two operating positions to respectively and alternately open and close said secondary conduit structure, a source of engine torque demand sensitive pressure, and passage means for subjecting said pilot valve element to said torque demand sensitive pressure for actuating the same.

11. The combination as set forth in claim 10 wherein said distributor valve means further includes a valve spring interposed between said valve plunger and said distributor valve element.

12. In a control system for an automatic power transmission mechanism including gear elements capable of delivering power from an engine to a driven member, a source of main control fluid pressure, means for controlling the relative motion of said gear elements including a first fluid pressure operated servo that is actuated during torque delivery in one direction, a second fluid pressure operated servo that is actuated during torque delivery in the opposite direction, primary conduit structure interconnecting said fluid pressure source and said servo including a distributor valve means for selectively and alternately directing fluid pressure to each of said first and second servos, said distributor valve means including a distributor valve chamber and a distributor valve element movably disposed in said chamber, a valve plunger situated in said valve chamber on one side of said valve element along the path of movement thereof, a branch passage defining a part of said primary conduit structure and communicating with said distributor valve chamber whereby said distributor valve element is subjected to main control pressure, secondary conduit structure interconnecting said pressure source and said distributor valve chamber for subjecting said valve plunger to a main control pressure force, a pilot valve mechanism situated in and forming a portion of said secondary conduit structure, said pilot valve mechanism including a pilot valve element adapted to move to either of two operating positions to respectively and alternately open and close said secondary conduit structure, a source of engine torque demand sensitive pressure, a source of governor pressure sensitive to the speed of said driven member, and first passage means for subjecting said pilot valve element to said torque demand sensitive pressure for actuating the same and second passage means for subjecting a portion of said distributor valve means to said governor pressure to establish a distributor valve element actuating force.

13. In a control system for an automatic power transmission mechanism having torque transmitting gear elements for transmitting torque from a driving shaft to a driven shaft, a source of main control pressure, means for controlling the relative motion of said gear elements including a first servo means that is actuated during transfer of torque between said shafts in one direction and a second servo that is actuated during transfer of torque between said shafts in the opposite direction, conduit structure interconnecting said servos and said pressure source, pressure distribution valve means situated in and partly defining said conduit structure including a movable fluid pressure actuated valve element for selectively distributing control pressure to said first and second servos, pressure passage means communicating with said distribution valve means for subjecting said valve element to an actuating pressure force, pilot valve means for alternately pressurizing and exhausting said pressure passage means, and means for sujecting said pilot valve means to a fluid pressure signal for actuating the same.

14. In a control system for an automatic power transmission mechanism having torque transmitting gear elements for transmitting torque from a driving shaft to a driven shaft, a source of main control pressure, means for producing a fluid pressure signal proportional in magnitude to an operating parameter of said mechanism, means for controlling the relative motion of said gear elements including a first servo means that is actuated during torque delivery through said gear elements from one shaft to another at a first motion transmitting ratio, a second servo means that is actuated during torque delivery through said gear elements from one shaft to another at a second motion transmitting ratio, conduit structure interconnecting said servos and said pressure source, pressure distribution valve means situated in and partly defining said conduit structure including a movable fluid pressure actuated valve element for selectively distributing control pressure to said first and second servos, first pressure passage means communicating with said distribution valve means for subjecting said valve element to an actuating pressure force, pilot valve means for alternately pressurizing and exhausting said first pressure passage means, and second pressure passage means communicating with said pressure signal producing means for subjecting said pilot valve means to said fluid pressure signal for actuating the same.

15. In a control system for an automatic power transmission mechanism having torque transmitting gear elements for transmitting torque from a driving shaft to a driven shaft, a source of main control pressure, means for producing a first fluid pressure signal proportional in magnitude to a first operating parameter of said mechanism, means for producing a second pressure signal proportional in magnitude to a second operating parameter of said mechanism means for controlling the relative motion of said gear elements including a first servo means that is actuated during torque delivery through said gear elements from one shaft to the other at a first motion transmitting ratio and a second servo means that is actuated during torque delivery through said gear elements from one shaft to the other at a second motion transmitting ratio, conduit structure interconnecting said servos and said pressure source, pressure distribution valve means situated in and partly defining said conduit structure including a movable fluid pressure actuated valve element for selectively distributing fluid pressure to said first and second servos upon movement of said valve element to a first operating position and to a second operating position respectively, first pressure passage means communicating with said distribution valve means for subjecting said valve element to an actuating pressure force whereby said valve element is biased toward one operating position, pilot valve means for alternately pressurizing and exhausting said passage means, second passage means communicating with said first fluid pressure signal producing means for subjecting said pilot valve means to said first fluid pressure signal for actuating the same, third passage means communicating with said second fluid pressure signal producing means for subjecting said valve element to said second fluid pressure signal whereby said valve element is urged toward said one operating position, and means for biasing said valve element toward the second operating position.

16. In a control system for an automatic power transmission mechanism having torque transmitting gear elements for transmitting torque from a driving shaft to a driven shaft, a source of main control pressure, means for controlling the relative motion of said gear elements including a first servo means that is actuated during torque delivery through said gear elements from one shaft to the other at a first motion transmitting ratio and a second servo means that is actuated during torque transfer through said gear elements from one shaft to the other at a second motion transmitting ratio, conduit structure interconnecting said servos and said pressure source, pressure distribution valve means situated in and partly defining said conduit structure including a movable fluid pressure actuated valve element for selectively distributing main control pressure to said first and second servos upon movement thereof to a first operating position and to a second operating position respectively, means for normally urging said valve element toward one operating position, said pressure distribution valve means including a valve plunger situated adjacent said valve element, pressure passage means communicating with said distribution valve means for subjecting said valve plunger to an actuating pressure force whereby said valve element is biased toward the other operating position, pilot valve means for alternately pressurizing and exhausting said passage means, means for subjecting said pilot valve means to a first fluid pressure signal for actuating the same, and means for subjecting said valve element to a second pressure signal to bias the same toward said other operating position.

17. In a control system for an automatic power transmission mechanism, a source of main control pressure, two fluid pressure operated servos, conduit structure interconnecting said pressure source and said servos, a distributor valve chamber, said conduit structure including a pressure passage interconnecting said control pressure source and said valve chamber, and a passage extending from said valve chamber to each servo, a movable distributor valve element situated in said valve chamber, passage means for subjecting said movable valve element to said main control pressure, said passage means including a pilot valve element adapted to interrupt and establish selectively communication between said pressure source and said valve chamber, a first pressure signal source for establishing a first variable control pressure proportional in magnitude to a first operating parameter of said mechanism, auxiliary passage means for subjecting said pilot valve element to said first variable control pressure to actuate the same whereby the valve actuating forces acting on said distributor valve element are controlled by said pilot valve element, a second pressure signal source for establishing another variable control pressure proportional in magnitude to another operating parameter of said mechanism, and another auxiliary passage means for distributing said other variable control pressure to said distributor valve element to establish a second fluid pressure force on said distributor valve element.

18. In a control system for an automatic power transmission mechanism having torque transmitting gear elements for transmitting torque from an engine to a driven shaft, means for producing a fluid pressure signal proportional in magnitude to an operating parameter of said mechanism, means for controlling the relative motion of said gear elements including first and second fluid pressure operated servos, a source of main control pressure, conduit structure interconnecting said servos and said pressure source, pressure distributing valve means situated in and partly defining said conduit structure including a movable pressure actuated valve element for selectively distributing control pressure to said first and second servos, first pressure passage means communicating with said distribution valve means for subjecting said valve element to an actuating pressure force, pilot valve means disposed in and partly defining said first pressure passage means for controlling the transfer of fluid pressure in said first pressure passage means to said distribution valve means, and second pressure passage means communicating with said pressure signal producing means for subjecting said pilot valve means to said fluid pressure signal for actuating the same.

19. In a control system for an automatic power transmission mechanism having torque transmitting gear elements for transmitting torque from an engine to a driven shaft, means for producing a fluid pressure signal proportional in magnitude to a torque demand operating parameter of said mechanism, means for controlling the relative motion of said gear elements including first and second fluid pressure operated servos, a source of main control pressure, conduit structure interconnecting said servos in said pressure source, pressure distributing valve means situated in and partly defining said conduit structure including a movable pressure actuated valve element for selectively distributing control pressure to said first and second servos, first pressure passage means communicating with said distribution valve means for subjecting said valve element to an actuating pressure force, pilot valve means disposed in and partly defining said first pressure passage means for controlling the transfer of fluid pressure in said first pressure passage means to said distribution valve means, and second pressure passage means communicating with said pressure signal producing means for subjecting said pilot valve means to said fluid pressure signal for actuating the same, means for producing another fluid pressure signal that is proportional in magnitude of the speed of said driven shaft, and third pressure passage means for subjecting said valve element to said second pressure signal.

References Cited in the file of this patent

UNITED STATES PATENTS

| | | |
|---|---|---|
| 2,640,373 | Jandasek | June 2, 1953 |
| 2,679,768 | Baule | June 1, 1954 |
| 2,855,803 | Knowles | Oct. 4, 1958 |
| 2,872,000 | Herndon et al. | Feb. 3, 1959 |
| 3,023,636 | Kelley et al. | Mar. 6, 1962 |
| 3,025,718 | Christenson | Mar. 20, 1962 |